United States Patent
Mandler (10) Patent No.: US 10,537,944 B2
(45) Date of Patent: Jan. 21, 2020

(54) MILLING DEVICE FOR OPTICAL LENS PRODUCTION WITH TWO MILLING STATIONS AND METHOD OF USE

(71) Applicant: OptoTech Optikmaschinen GmbH, Wettenberg (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 0 days.

(21) Appl. No.: 15/042,200

(22) Filed: Feb. 12, 2016

(65) Prior Publication Data
US 2016/0250694 A1 Sep. 1, 2016

(30) Foreign Application Priority Data
Feb. 27, 2015 (DE) .................. 10 2015 102 899

(51) Int. Cl.
*B23C 3/00* (2006.01)
*B23Q 7/04* (2006.01)
(Continued)

(52) U.S. Cl.
CPC ............. *B23C 3/00* (2013.01); *B23B 3/065* (2013.01); *B23B 9/00* (2013.01); *B23C 3/16* (2013.01);
(Continued)

(58) Field of Classification Search
CPC . B23C 2215/40; B23C 2220/04; B23Q 39/04; B23Q 2039/002; B23Q 7/04;
(Continued)

(56) References Cited

U.S. PATENT DOCUMENTS 2,194,780 A 3/1940 Andersen
4,452,109 A 6/1984 Ballach et al.
(Continued)

FOREIGN PATENT DOCUMENTS

CA 2396284 7/2001
DE 951259 10/1956
(Continued)

OTHER PUBLICATIONS

EPO Machine Translation of WO2005/005098A1—Blazek et al., "Machine Tool Having Two Parallel Spindle Rows That Can Be Displaced Relative To One Another," Jan. 20, 2005.*

*Primary Examiner* — Erica E Cadugan
*Assistant Examiner* — Michael Vitale
(74) *Attorney, Agent, or Firm* — Clark & Brody (57) ABSTRACT

A milling device having a first milling station with a first workpiece spindle capable of rotating about a first spindle axis A1 intended to receive a first lens blank and with a first milling tool with first cutters capable of rotating about a first milling axis FA1 intended for machining a received first lens blank. At least one second milling station with a second workpiece spindle capable of rotating about a second spindle axis A2 receives a second lens blank, and with a second milling tool with second cutters capable of rotating about a second milling axis FA2 machining the received second lens blank, the spindle axes A1, A2 being aligned parallel to one another, the milling axes FA1, FA2 being aligned parallel to one another, and obliquely aligned to the spindle axes A1, A2. The invention also includes a method for the operation of the milling device.

12 Claims, 4 Drawing Sheets

(51) Int. Cl.
  *B23Q 39/04*   (2006.01)
  *B23Q 7/14*    (2006.01)
  *B23B 9/10*    (2006.01)
  *B23B 3/06*    (2006.01)
  *B23B 9/00*    (2006.01)
  *B23C 3/16*    (2006.01)
  *B23Q 11/08*   (2006.01)
  *B23Q 39/00*   (2006.01)

(52) U.S. Cl.
  CPC .......... *B23Q 7/048* (2013.01); *B23Q 7/1421* (2013.01); *B23Q 39/04* (2013.01); *B23C 2215/40* (2013.01); *B23C 2220/04* (2013.01); *B23C 2226/61* (2013.01); *B23C 2270/14* (2013.01); *B23Q 11/08* (2013.01); *B23Q 2039/002* (2013.01); *B23Q 2039/008* (2013.01); *Y10T 29/5109* (2015.01); *Y10T 409/3056* (2015.01); *Y10T 409/30756* (2015.01); *Y10T 409/305656* (2015.01); *Y10T 409/307784* (2015.01); *Y10T 409/308344* (2015.01)

(58) Field of Classification Search
  CPC ........ B23Q 7/041; B23Q 7/046; B23Q 7/048; Y10T 409/3056; Y10T 409/305656; Y10T 409/30756; Y10T 409/307784; Y10T 409/308344; Y10T 409/308568; Y10T 29/5109; Y10T 29/5114; Y10T 483/16
  USPC .............. 409/164, 165, 199, 203, 213, 217; 29/27 C, 27 R; 483/14
  See application file for complete search history.

(56) References Cited

U.S. PATENT DOCUMENTS

| | | | |
|---|---|---|---|
| 4,612,832 A | 9/1986 | Ushigoe et al. | |
| 4,829,716 A | 5/1989 | Ueda et al. | |
| 5,105,694 A | 4/1992 | Smith et al. | |
| 5,704,262 A | 1/1998 | Baumbusch et al. | |
| 6,129,174 A | 10/2000 | Brown et al. | |
| 6,568,990 B2 | 5/2003 | Siders et al. | |
| 6,796,878 B2 * | 9/2004 | Mitsuzono | B23Q 1/52 29/27 R |
| 6,953,381 B2 | 10/2005 | Siders et al. | |
| 7,086,928 B2 | 8/2006 | Siders et al. | |
| 7,128,638 B2 | 10/2006 | Siders et al. | |
| 7,371,154 B2 | 5/2008 | Siders et al. | |
| 7,422,510 B2 * | 9/2008 | Schneider | B24B 27/0061 451/10 |
| 7,480,970 B2 | 1/2009 | Meyer et al. | |
| 7,737,778 B2 | 6/2010 | Fiedler et al. | |
| 7,828,624 B2 | 11/2010 | Siders et al. | |
| 7,975,356 B2 | 7/2011 | Schafer et al. | |
| 8,166,622 B2 | 5/2012 | Meyer et al. | |
| 8,484,820 B2 | 7/2013 | Saeki | |
| 8,556,678 B2 | 10/2013 | Siders et al. | |
| 9,539,684 B2 | 1/2017 | Honegger et al. | |
| 2001/0051490 A1 | 12/2001 | Siders et al. | |
| 2002/0006764 A1 * | 1/2002 | Hanisch | B23Q 1/52 451/1 |
| 2002/0134207 A1 | 9/2002 | Miyano | |
| 2003/0181133 A1 | 9/2003 | Siders et al. | |
| 2005/0266772 A1 | 12/2005 | Siders et al. | |
| 2006/0166609 A1 | 7/2006 | Siders et al. | |
| 2006/0260447 A1 | 11/2006 | Savoie et al. | |
| 2006/0260448 A1 | 11/2006 | Fiedler et al. | |
| 2007/0094857 A1 | 5/2007 | Savoie | |
| 2007/0167112 A1 | 7/2007 | Siders et al. | |
| 2007/0264915 A1 | 11/2007 | Mazoyer | |
| 2007/0293128 A1 | 12/2007 | Schafer et al. | |
| 2008/0026679 A1 | 1/2008 | Siders et al. | |
| 2008/0055542 A1 | 3/2008 | Haddadi | |
| 2008/0169593 A1 | 7/2008 | Shen et al. | |
| 2011/0084433 A1 * | 4/2011 | Fiedler | B24B 41/005 269/56 |
| 2011/0233879 A1 * | 9/2011 | Tullmann | B23Q 1/44 279/110 |
| 2011/0256806 A1 | 10/2011 | Monnoyeur | |
| 2011/0281502 A1 | 11/2011 | Siders et al. | |
| 2017/0050286 A1 | 2/2017 | Hegener | |
| 2018/0272493 A1 | 9/2018 | Traina et al. | |

FOREIGN PATENT DOCUMENTS

| | | | |
|---|---|---|---|
| DE | 3626324 | 2/1988 | |
| DE | 8700343 | 5/1988 | |
| DE | 3924078 | 1/1991 | |
| DE | 19504368 | 8/1996 | |
| DE | 19516774 | 11/1996 | |
| DE | 10029967 | 1/2002 | |
| DE | 10106659 | 8/2002 | |
| DE | 20314702 | 1/2004 | |
| DE | 10235873 | 2/2004 | |
| DE | 102004005498 | 8/2005 | |
| DE | 102006050425 | 5/2007 | |
| DE | 102007031703 | 1/2009 | |
| DE | 102007042667 | 3/2009 | |
| DE | 102007043421 | 3/2009 | |
| DE | 102007045039 | 3/2009 | |
| DE | 102010045151 | 3/2012 | |
| DE | 102012101581 | 8/2013 | |
| DE | 102012004547 | 9/2013 | |
| DE | 102014113421 | 3/2016 | |
| DE | 102015102900 | 9/2016 | |
| EP | 0737544 | 10/1996 | |
| EP | 1175962 | 1/2002 | |
| EP | 1 291 106 | 3/2003 | |
| EP | 1310326 | 5/2003 | |
| EP | 1559508 | 8/2005 | |
| EP | 1595644 | 11/2005 | |
| EP | 1647360 | 4/2006 | |
| EP | 1 719 582 | 11/2006 | |
| EP | 1 719 585 | 11/2006 | |
| EP | 2161098 | 3/2010 | |
| EP | 1409198 | 7/2010 | |
| EP | 2308644 | 4/2011 | |
| FR | 2575101 | 6/1986 | |
| GB | 332245 | 7/1930 | |
| GB | 2271945 A * | 5/1994 | ............... B23Q 1/48 |
| JP | 2002-120109 | 4/2002 | |
| WO | 01/53038 | 7/2001 | |
| WO | 2004/080653 | 9/2004 | |
| WO | 2005/005098 | 1/2005 | |

* cited by examiner

MILLING DEVICE FOR OPTICAL LENS PRODUCTION WITH TWO MILLING STATIONS AND METHOD OF USE

The invention relates to a milling device for the manufacture of optical lenses or for the pre-milling of lens blanks according to the preamble to claim 1 and a method for the operation of such a milling device as claimed in claim 12.

In the prior art, lens blanks are used for the manufacture of optical lenses, in particular lens blanks made of plastics such as polycarbonate, CR39 and so-called "High Index" materials. For the manufacture of an individual surface, e.g. for the manufacture of optical lenses on prescription, for reasons of efficiency the lens blanks are machined in a two-stage process, namely initially with a milling tool and subsequently with a turning tool.

Combined milling/turning tools [EP 1 291 106 A] and machines with separate milling units and (operating in a linear or rotary manner) turning machining units exist. In the case of the latter, the optical lenses are either machined in series [EP 1 719 585 A]—the same optical lens being first milled and subsequently turned in the working area of the machine—or are machined in parallel [EP 1 719 582 A1]—different optical lenses being machined at the same time in the working area of the machine, whereby one is milled while the other is turned.

Production equipment is familiar from DE 20 2006 021 076 U1, for example, in which a machine on a machine frame has a workpiece holder on a slide, a milling tool and two turning tools. The workpiece holder holds a lens blank indirectly via a block piece. Direct holding without a block piece is also conceivable, however. The workpiece holder is moved initially with the slide into a working area of the milling tool, and the received lens blank is machined by milling. The workpiece holder is then moved into a working area of the first turning tool, and the lens blank is machined by turning. The workpiece holder is then moved into a working area of the second turning tool, and the lens blank is again machined by turning. Spherical, aspherical, toric, atoric, progressive or free-form geometries can be achieved in this way. As a general rule, the machining is followed by fine grinding or polishing processes in order to achieve the required surface quality. Coatings and/or stabilization steps are also carried out as appropriate.

A disadvantage associated with a device according to DE 20 2006 021 076 U1 is that only a small number of lens blanks can be machined per unit of time. As a result, the manufacturing costs per machined lens blank are high.

The device according to EP 1 719 582 A1 accordingly differs from DE 20 2006 021 076 U1 in that, among other things, the turning unit has a workpiece spindle and the milling unit has a separate workpiece holder. This ensures that two lens blanks are machined at the same time, namely one with the milling tool and one with the turning tool. The milled lens blank is removed from the workpiece holder by means of a loading device and it is subsequently introduced directly into the workpiece spindle, while a new lens blank is introduced into the workpiece holder at the same time.

As a result of this, the efficiency of the production equipment is increased and the manufacturing costs per machined lens blank compared with DE 20 2006 021 076 U1 are reduced. The efficiency is still low, however, and the manufacturing costs per machined lens blank are high. In addition, vibrations are transferred from the milling unit to the turning unit, with the result that the precision of the turning process is low.

The object of the invention is to overcome the disadvantages of the prior art, and to make available a milling device and a method, with which high-quality pre-machining of the lens blank, an increase in the efficiency and a reduction in the manufacturing costs per machined lens blank are achieved respectively. The invention is intended to be reliable, easy to use and cost-effective.

Principal characterizing features of the invention are indicated in the characterizing part of claim 1 and claim 12.

The invention relates to a milling device having a first milling station with a first workpiece spindle capable of rotating about a first spindle axis intended to receive a first lens blank and with a first milling tool with first cutters capable of rotating about a first milling axis intended for machining a received first lens blank (in particular in the first workpiece spindle), wherein at least one second milling station is proposed, which has a second workpiece spindle capable of rotating about a second spindle axis intended to receive a second lens blank and a second milling tool with second cutters capable of rotating about a second milling axis intended for machining a received second lens blank (in particular in the second workpiece spindle). In this case, the spindle axes are aligned parallel to one another, the milling axes are aligned parallel to one another, and the milling axes are aligned obliquely to the spindle axes.

An advantage associated with the milling device according to the invention is that at least two lens blanks can be machined at the same time by milling by the proposed at least two milling stations. This results in a particularly high efficiency of the milling device and in low manufacturing costs per machined lens blank. In the event that more than two milling stations are proposed, e.g. up to six in number, the efficiency will increase further. The milling device nevertheless remains very compact. The milling device preferably has a CNC controller, in order to be able to operate in the most highly automated manner possible.

In a variant of the milling device it is proposed that the milling stations, preferably the milling tools, have a common transverse drive, with which the distance of the milling axes in relation to the spindle axes is capable of being varied, preferably transversely to the spindle axis or by a displacement parallel to the plane of the spindle axes. Consequently, the milling stations can be arranged next to one another in a space-saving manner, since collisions between the milling tools are avoided, in particular if these are arranged on a common milling slide. A common transverse drive can also be achieved in a cost-effective manner. Each milling tool preferably has its own drive motor. This can likewise be installed on the milling slide.

According to a more detailed embodiment, the milling stations, preferably the workpiece spindles, have a common linear drive, with which the distance of the workpiece spindles in the direction of the spindle axes is capable of being varied in relation to the milling tools. Only a linear drive is necessary, therefore, in particular when the workpiece spindles are mounted on a common longitudinal slide. This is cost-effective.

In an optional embodiment, the workpiece spindles, in particular the holders for the lens blanks, are arranged in a common spindle plane. This results in a compact embodiment of the milling device.

It is appropriate, furthermore, to align the milling axes at an angle of between 30 degrees and 87 degrees obliquely to the spindle axes, preferably at an angle of between 50 degrees and 85 degrees, more preferably between 65 degrees and 82 degrees, and particularly preferably between 70 degrees and 80 degrees. In this angular range, surface machining of high quality on the lens blank is achieved with the cutters. The optimal angle should be selected depending on the milling head.

In one particular design of the milling device, the distance between the spindle axes corresponds to the distance between the milling axes. Simultaneous machining of two lens blanks is obtained as a result, so that a high rate of production is achieved.

It is proposed, furthermore, according to one variant of the invention, that the cutters are situated in the plane of the spindle axes on the side of the milling axes facing in the direction of the workpiece spindles. In this way, the engagement of the cutters in the lens blank takes place in the plane of the spindle axes, and this makes it possible to machine the lens blank as far as the center.

The milling tools are preferably arranged on a common milling slide. As a result, only a single drive with only a single drive control is required in order to displace the milling tools. This is cost-effective and reduces the programming effort.

In addition or optionally, the workpiece spindles can be arranged on a common spindle slide. The necessary drive units and thus the costs of the milling device are also kept low as a result of this.

In a variant embodiment of the milling device, this has a loading device, which is embodied to load lens blanks into the workpiece spindles. As a result, the loading is automated and is easily implemented. The loading device preferably unloads the workpiece spindles in addition.

In a special variant of the loading device, one pair of holding means per milling station is proposed in each case in order to receive two lens blanks, the holding means of the pairs being aligned angularly to one another and being connected to one another, and the pairs of holding means being mounted so as to be capable of rotating about a common axis of rotation. As a result, very rapid replacement of lens blanks in the workpiece spindles is possible. The efficiency of the milling device is thus particularly high. Such pairs of holding means or the axis of rotation can be mounted on a transport arm, in particular for the parallel displacement of the axis of rotation. A perpendicular arrangement of the two holding means is appropriate for the angular connection of the pairs. The axis of rotation is preferably aligned perpendicularly to the spindle axes of the workpiece spindles. In addition, the distance between the pairs of holding means preferably corresponds to the distance between the spindle axes. As a result, only a small number of motion sequences are necessary in order to perform the rapid replacement of lens blanks, and accordingly few actuators are required.

A further, more detailed embodiment of the milling device proposes that the workpiece spindles and the milling tools are capable of being positioned offset in relation to one another in such a way that a lens blank (100a, 100b, 100c, 100d) is capable of being introduced between the milling tools (53a, 53b), in particular for the loading and unloading of the workpiece spindles with lens blanks. The introduction takes place optionally by means of the workpiece spindles and the linear drive or by the loading device. The milling device is particularly compact as a result, because it is exposed by the smallest possible relative movement of the space required for the loading of the workpiece spindles.

The invention relates in addition to a method for the operation of a previously described milling device, in which loading of a first lens blank into the first workpiece spindle and of a second lens blank into the second workpiece spindle tales place initially. Simultaneous machining of the first lens blank with the first milling tool and machining of the second lens blank with the second milling tool then takes place. This is followed by removal of the first lens blank and removal of the second lens blank from the workpiece spindles. Accordingly, two lens blanks are machined in a machine at the same time, with the result that high production quantities are achieved from a compact and economical embodiment of the milling device.

The method can be followed optionally by loading of a third and loading of a fourth lens blank into the workpiece spindles, and the steps of machining and removal can be repeated.

Further characterizing features, details and advantages of the invention can be appreciated from the wording of the claims as well as from the following description of illustrative embodiments on the basis of the drawings. In the drawings:

Figure 1:
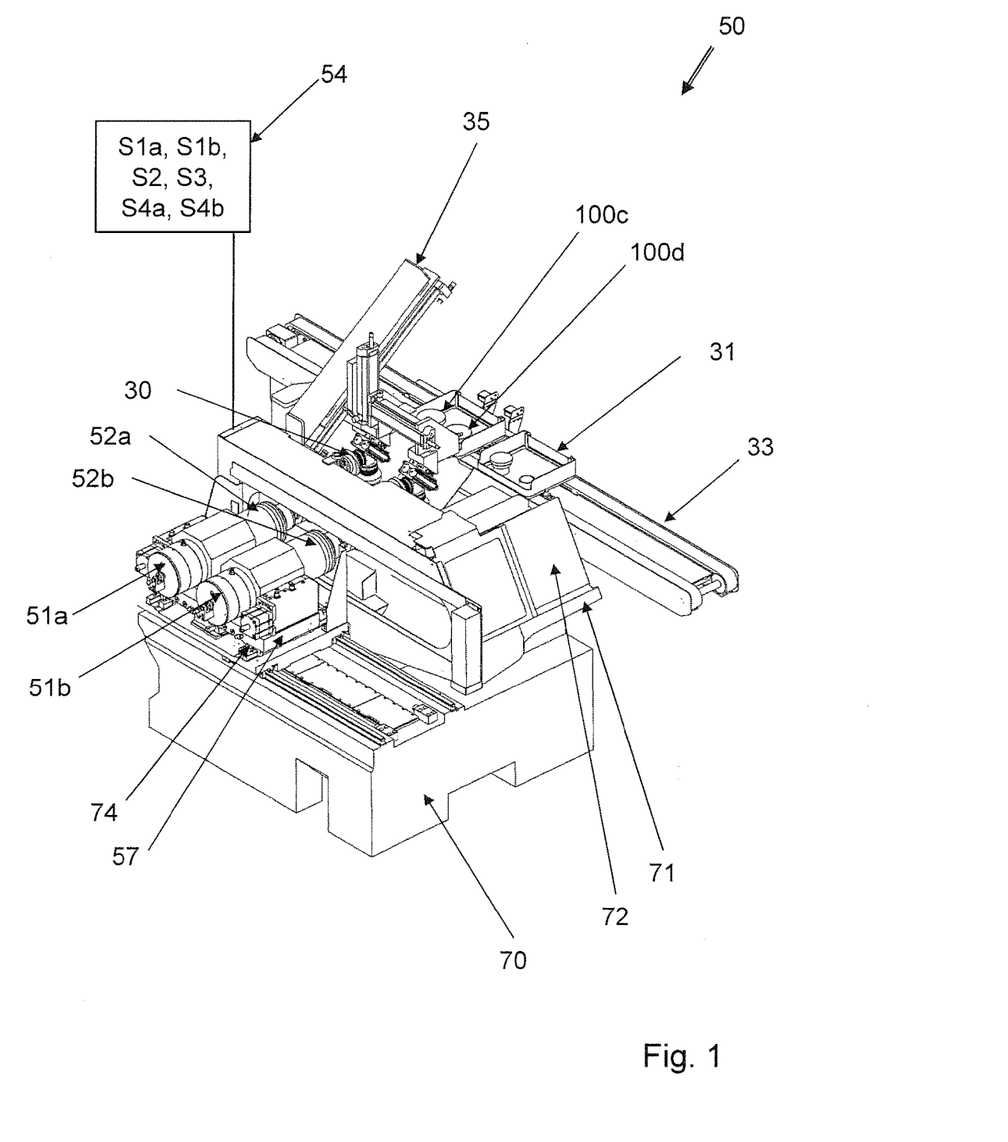
FIG. 1 depicts a perspective view of a milling device with a machine bed and enclosure.
Figure 2:
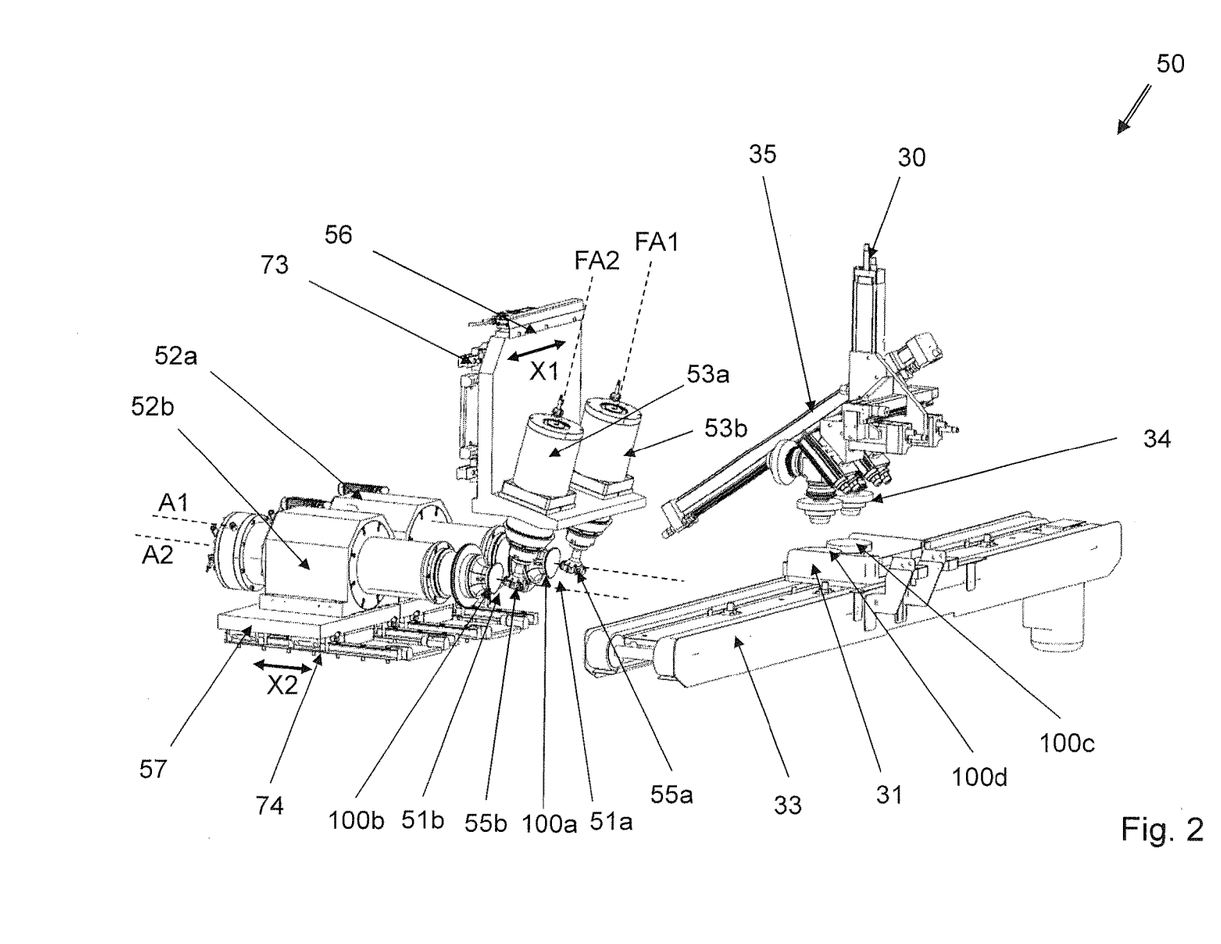
FIG. 2 depicts a perspective view of a milling device with the enclosure removed.
Figure 3:
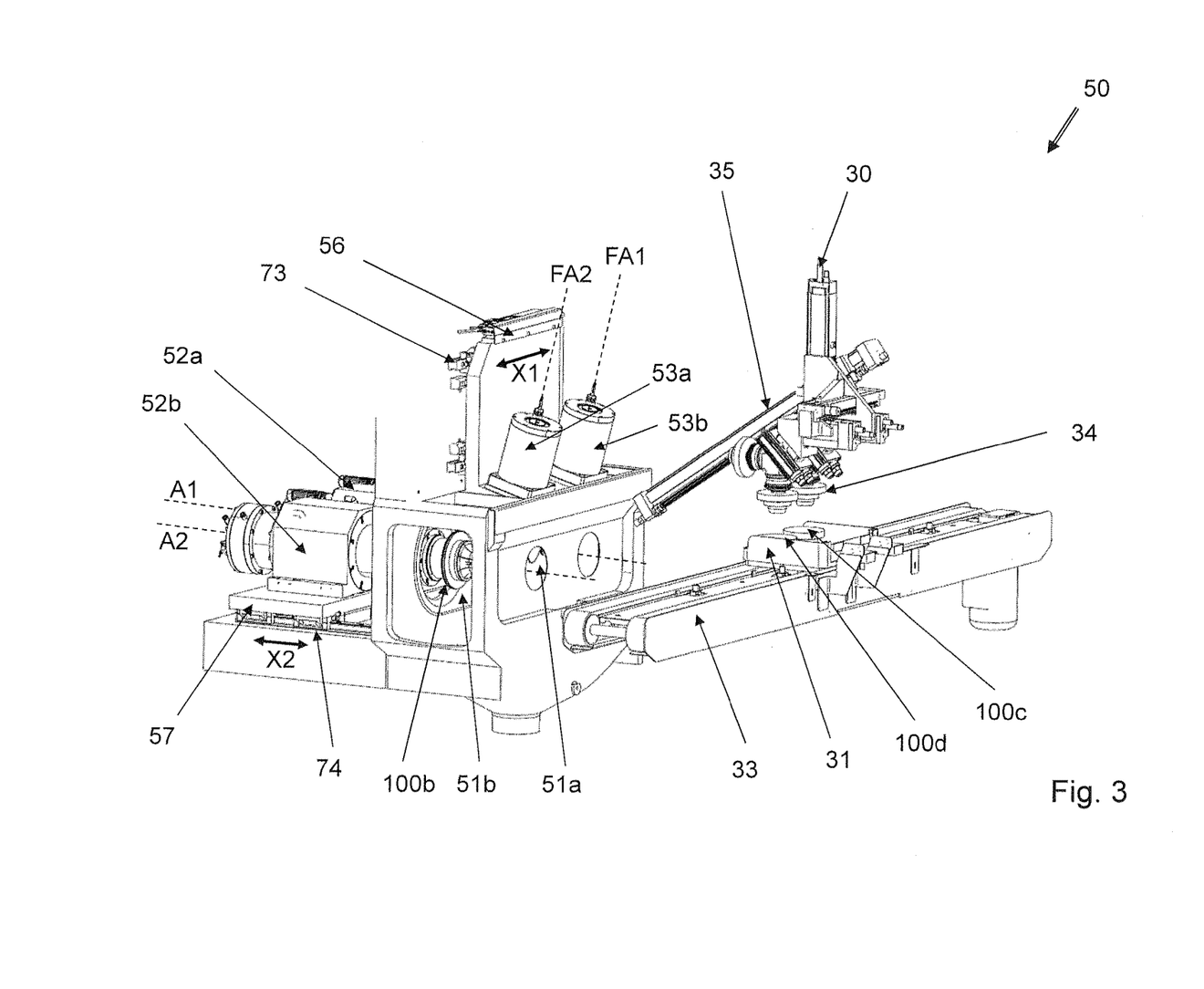
FIG. 3 depicts a perspective view of a milling device for a slightly less dissociated enclosure.
Figure 4:
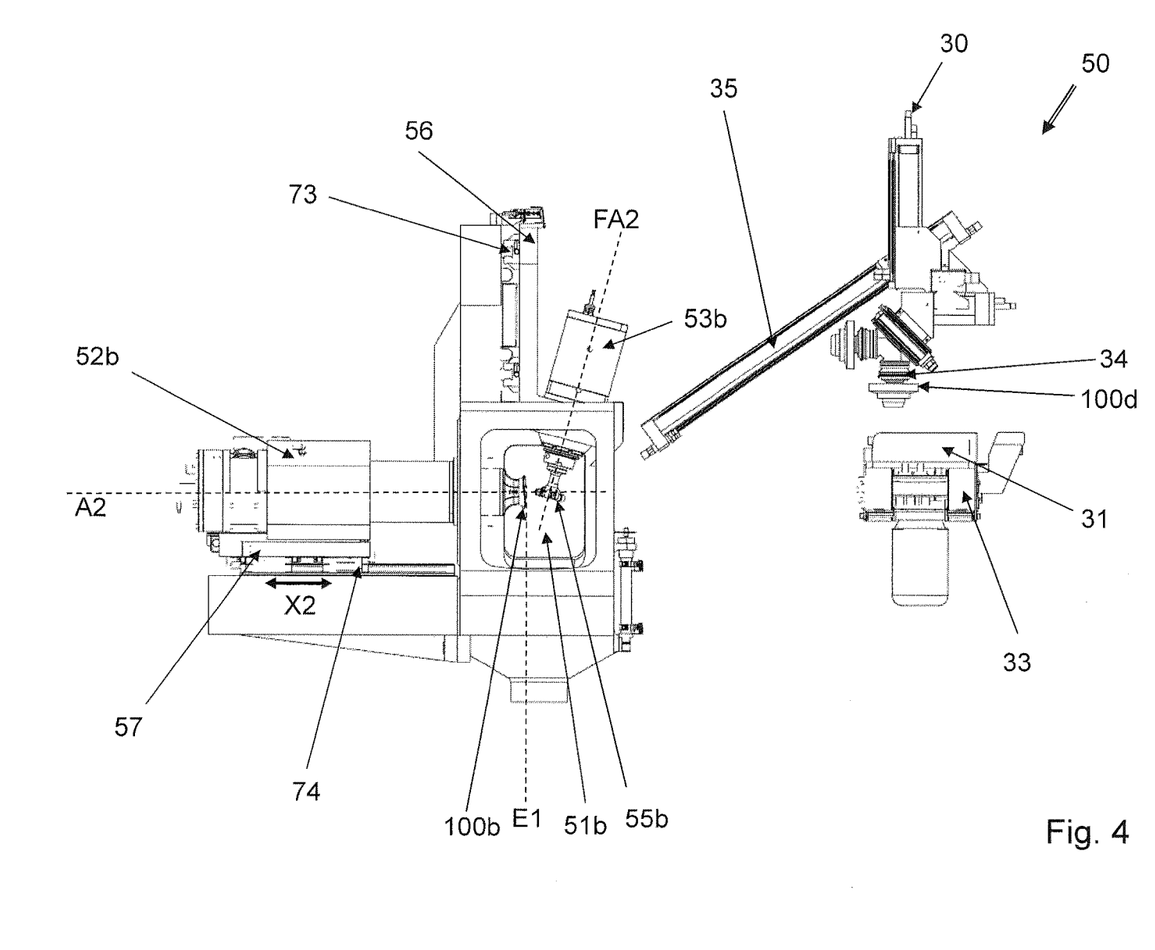
FIG. 4 depicts a side view of a milling device with the enclosure removed.

FIGS. 1, 2, 3 and 4 depict a milling device 50 in different perspective views, each of which has a first and a second milling station 51a, 51b. Not all of the technical characterizing features and thus not all of the reference designations are apparent in each of FIGS. 1 to 4. In addition, FIG. 2 depicts an expanded type of machine of a milling device 50, and FIGS. 2 to 4 depict a similar second type of machine.

A feature common to all the milling devices 50 according to FIGS. 1 to 4 is that the first milling station 51a (only visible in FIGS. 1 to 3) has a first workpiece spindle 52a (only visible in FIGS. 1 to 3) that is capable of rotating and is intended to receive a first lens blank 100a (only visible in FIG. 2) and a first milling tool 53a (only visible in FIGS. 2 and 3) intended for machining the received lens blank 100a. At the same time, the second milling station 51b has a second workpiece spindle 52b that is capable of rotating and is intended to receive a second lens blank 100b (only visible in FIGS. 2 to 4) and a second milling tool 53b (only visible in FIGS. 2 to 4) intended for machining the received second lens blank 100b. The first and the second workpiece spindles 52a, 52b in this case have spindle axes A1, A2 that are aligned in parallel. In addition, the first and the second workpiece spindles 52a, 52b are arranged in a common spindle plane E1 (only indicated in FIG. 4).

The first workpiece spindle 52a is capable of rotating about a first spindle axis A1 (see FIGS. 2 and 3), and the second workpiece spindle 52b is capable of rotating about a second spindle axis A2 (see FIGS. 2 to 4). The first milling tool 53a has first cutters 55a (only visible in FIG. 2), which are rotatably driven about a first milling axis FA1 (only visible in FIGS. 2 and 3). The second milling tool 53b is accordingly also equipped with second cutters 55b (see FIGS. 2 and 4), which are rotatably driven about a second milling axis FA2 (see FIGS. 2 to 4). The spindle axes A1, A2 are aligned parallel to one another, the milling axes FA1, FA2 are aligned parallel to one another, and the milling axes FA1, FA2 are aligned obliquely to the spindle axes A1, A2. The angle between the plane of the spindle axes A1, A2 and the plane of the milling axes FA1, FA2 is between 30 degrees and 87 degrees, preferably between 50 degrees and 85 degrees, more preferably between 65 degrees and 82 degrees, particularly preferably between 70 degrees and 80 degrees, and in the present case 75 degrees. Furthermore, the distance between the spindle axes A1, A2 is the distance between the milling axes FA1, FA2. It will be appreciated in addition in FIG. 4 that the cutters 55*b* are situated in the plane of the spindle axes A2 on the side of the milling axes FA2 facing in the direction of the workpiece spindles 52*b*.

The milling stations 51*a*, 51*b* are of the same type and are configured for the machining of lens blanks 100*a*, 100*b* of the same type. In particular, the workpiece spindles 51*a*, 51*b* are (as far as possible) of identical design, and the milling tools 53*a*, 53*b* are (as far as possible) of identical design. An exception applies to design-related variations in connections and joints.

The first and second workpiece spindles 52*a*, 52*b* of the two milling stations 51*a*, 51*b* are mounted on a common machine bed 70 (illustrated only in FIG. 1), which in particular is of monolithic configuration. In addition, the two milling stations 51*a*, 51*b* have a common longitudinal drive 74, with which the distance X2 (see FIGS. 2 to 4) of the workpiece spindles 52*a*, 52*b* is capable of being varied in relation to the milling tools 53*a*, 53*b*. For this purpose, the first and the second workpiece spindles 52*a*, 52*b* are installed on a common spindle slide 57.

In addition, the milling stations 51*a*, 51*b*, in particular the milling tools 53*a*, 53*b*, have a common transverse drive 73, with which the distance X1 of the milling axes FA1, FA2 is capable of being varied in relation to the spindle axes A1, A2. For this purpose, the two milling tools 53*a*, 53*b* are installed or mounted on a common milling slide 56 (see FIGS. 2 to 4).

For machining the lens blanks 100*a*, 100*b*, the milling tools 53*a*, 53*b* are guided by movement of the transverse slide 56 in the direction X1 over one lens blank 100*a*, 100*b* respectively, in particular also over its center. For the production of desired surface geometries on the lens blanks 100*a*, 100*b*, the distance X2 is modulated at the same time with the spindle slide 57, while the lens blanks 100*a*, 100*b* are rotated about the spindle axes A1, A2. For this purpose, the milling device 50 has an electronic controller 54 (only represented schematically in FIG. 1) for the purpose of emitting drive signals S1*a*, S1*b*, S2, S3, S4*a*, S4*b* to the workpiece spindles 52*a*, 52*b*, the transverse drive 73, the linear drive 74 and the milling tools 53*a*, 53*b*, which are matched to one another.

Further proposed in FIGS. 1 to 4 respectively is a loading device 30, which is embodied to load lens blanks 100*a*, 100*b*, 100*c*, 100*d* into the workpiece spindles 52*a*, 52*b*. For this purpose, the loading device 30 has transport means 31, which in this case in particular are executed in the form of transport trays. These receive a pair of lens blanks in each case. As a result, one pair of lenses remains bundled together along the production line and can be supplied in each case as a pair to the individual machining stations, e.g. a turning tool, a polishing tool, coating facilities and blocking stations. The transport means 31 are guided on a conveyor rail 33. The lens blanks can be removed from the transport means 31 by means of holding means 34 (only indicated in FIGS. 2 to 4) on a transport arm 35 and can be supplied to the workpiece spindles 52*a*, 52*b*.

An optional characterizing feature of the milling device 50 is that the workpiece spindles 52*a*, 52*b* and the milling tools 53*a*, 53*b* are positioned offset in relation to one another in such a way that the loading device 30 is able to feed a lens blank 100*a*, 100*b*, 100*c*, 100*d* between the milling tools 53*a*, 53*b*. Particularly high compactness of the milling device 50 is achieved if one of the milling axes FA1, FA2 is positioned centrally between the spindle axes A1, A2 for loading and unloading.

The holding means 34 each have suction heads for holding the lens blanks 100*a*, 100*b*, 100*c*, 100*d*. The optional and special embodiment of the loading device 30 proposes that four holding means 34 are mounted on the transport arm 35. In each case two of the four holding means 34 are angularly connected to one another, in this case in particular perpendicularly. Both pairs of holding means 34 are mounted so as to be capable of rotating about a common axis of rotation. The axis of rotation is aligned perpendicularly to the spindle axes A1, A2. In addition, the distance between the pairs of holding means 34 corresponds to the distance between the spindle axes A1, A2.

With this arrangement of the loading device 30, it is possible to receive two pre-milled lens blanks 100*a*, 100*b*, 100*c*, 100*d* at the same time, in particular one lens blank 100*c*, 100*d* per pair of holding means 34 in each case. Two lens blanks 100*a*, 100*b* are then capable of being removed from the workpiece spindles 52*a*, 52*b* with the two free holding means 34. After rotation of the pairs of holding means through 90 degrees, the previously received lens blanks 100*c*, 100*d* are capable of being loaded into the workpiece spindles 52*a*, 52*b*. The finish-turned lens blanks 100*a*, 100*b* are then deposited in the free transport means 31. Two new pre-milled lens blanks are subsequently supplied with a further transport means 31 and can be received by the holding means 34. The loading and unloading of the workpiece spindles 52*a*, 52*b* is thus particularly rapid, and the efficiency of the milling device 50 is high. It will be appreciated that the angle of rotation of the pairs of holding means is dependent on their leg ankle and must not be exactly 90 degrees.

The milling device 50 is capable of being connected in a simple manner to other machines with the conveyor rail 33, for example to turning devices and/or coating devices. The loading device 30 or parts thereof should be connected to the machine bed 70. The transport arm 35 in particular should have a rigid connection to the machine bed 70. As a result, this is aligned exactly in relation to the workpiece spindles 52*a*, 52*b*. The conveyor rail is preferably connected to the machine bed 70 or to the base in a vibration-damped manner.

As can be appreciated in FIG. 1, the two milling stations 51*a*, 51*b* of the milling device 50 are arranged in a common production cell 71. The production cell 71 is configured by an enclosure housing 72. All that is present between the milling stations 51*a*, 51*b* is a free space, but no mechanical elements. Chip shields or the like may be provided optionally, however. The transport arm 35 connects the conveyor rail 33 outside the production cell 71 to the workpiece spindles 52*a*, 52*b* arranged inside the production cell 71.

Compared with FIGS. 1 and 3, the milling device according to FIG. 1 is supplemented by a further movement axis of the workpiece spindles 51*a*, 51*b*. The spindle slide 57 in this case is mounted on a transverse base slide, such that a cross slide arrangement is produced. This permits a lateral retraction of the workpiece spindles 51*a*, 51*b* from the working area of the milling stations 51*a*, 51*b*.

The invention is not restricted to one of the embodiments described above, but is capable of adaptation in many different ways.

All the characterizing features and advantages, including design details, spatial arrangements and process steps, emerging from the claims, the description and the drawing can be fundamental to the invention both separately and also in the most varied combinations.

List of Reference Designations

| | |
|---|---|
| 30 | loading device |
| 31 | transport means |
| 33 | conveyor rail |
| 34 | holding means |
| 35 | transport arm |
| 50 | milling device |
| 51a | first milling station |
| 51b | second milling station |
| 52a | first workpiece spindle |
| 52b | second workpiece spindle |
| 53a | first milling tool |
| 53b | second milling tool |
| 54 | control electronics |
| 55a | first cutters |
| 55b | second cutters |
| 56 | milling slide |
| 57 | spindle slide |
| 70 | machine bed |
| 71 | production cell |
| 72 | enclosure housing |
| 73 | transverse drive |
| 74 | linear drive |
| 100a | first lens blank |
| 100b | second lens blank |
| 100c | third lens blank |
| 100d | fourth lens blank |
| A1 | spindle axis (first workpiece spindle) |
| A2 | spindle axis (second workpiece spindle) |
| E1 | spindle plane (workpiece spindles) |
| FA1 | milling axis (first milling tool) |
| FA2 | milling axis (second milling tool) |
| S1a | drive signal (first workpiece spindle) |
| S1b | drive signal (second workpiece spindle) |
| S2 | drive signal (transverse drive) |
| S3 | drive signal (linear drive) |
| S4a | drive signal (first milling tool) |
| S4b | drive signal (second milling tool) |
| X1 | distance (milling axis - spindle axis) |
| X2 | distance (milling tool - workpiece spindle) |

The invention claimed is:

1. A milling device (50), comprising:
a first milling station (51a) with:
  a first workpiece spindle (52a) capable of rotating about a first spindle axis (A1), the first workpiece spindle (52a) intended to receive a first lens blank (100a), and
  a first milling tool (53a) with first cutters (55a) capable of rotating about a first milling axis (FA1), the first milling tool (53a) intended for machining the received first lens blank (100a); and
at least one second milling station (51b) with:
  a second workpiece spindle (52b) capable of rotating about a second spindle axis (A2), the second workpiece spindle (52b) intended to receive a second lens blank (100b), and
  a second milling tool (53b) with second cutters (55b) capable of rotating about a second milling axis (FA2), the second milling tool (53b) intended for machining the received second lens blank (100b),
the spindle axes (A1, A2) being aligned parallel to one another,
the milling axes (FA1, FA2) being aligned parallel to one another, and
the milling axes (FA1, FA2) being aligned obliquely with respect to the spindle axes (A1, A2),
wherein a loading device (30) is provided and arranged to load the first and second lens blanks (100a, 100b) into the first and second workpiece spindles (52a, 52b) and the first and second milling tools (53a, 53b) are separated from each other by a space which intersects with a virtual straight line extending lengthwise from a first end point to a second end point, the first end point linked to the first milling tool (53a) and being at a position within a physical body of the first milling tool (53a), and the second end point linked to the second milling tool (53b) and being at a position within a physical body of the second milling tool (53b), and
the workpiece spindles (52a, 52b) and the milling tools (53a, 53b) are capable of being positioned offset in relation to one another in such a way that one of the first and second lens blanks (100a, 100b) is capable of being introduced by the loading device (30) between the milling tools (53a, 53b) and through the space which intersects the virtual straight line extending from the first milling tool (53a) to the second milling tool (53b), the one of the first and second lens blanks (100a, 100b) crossing the virtual straight line between the first and second end points when introduced by the loading device (30) between the milling tools (53a, 53b) and through the space when being loaded into or unloaded from the workpiece spindles (52a, 52b).

2. The milling device (50) as claimed in claim 1, wherein the milling stations (51a, 51b) have a common transverse drive (73), with which a distance (X1) of the milling axes (FA1, FA2) in relation to the spindle axes (A1, A2) is capable of being varied.

3. The milling device (50) as claimed in claim 1, wherein the milling stations (51a, 51b) have a common linear drive (74), with which a distance (X2) of the workpiece spindles (52a, 52b) in a direction of the spindle axes (A1, A2) is capable of being varied in relation to the milling tools (53a, 53b).

4. The milling device (50) as claimed in claim 1, wherein the workpiece spindles (52a, 52b) are arranged in a common spindle plane (E1).

5. The milling device (50) as claimed in claim 1, wherein the milling axes (FA1, FA2) are aligned at an angle of between 30 degrees and 87 degrees obliquely to the spindle axes (A1, A2).

6. The milling device (50) as claimed in claim 1, wherein a distance between the spindle axes (A1, A2) corresponds to a distance between the milling axes (FA1, FA2).

7. The milling device (50) as claimed in claim 1, wherein the cutters (55a, 55b) are situated in a plane of the spindle axes (A1, A2) on a side of the milling axes (FA1, FA2) facing in a direction of the workpiece spindles (52a, 52b).

8. The milling device (50) as claimed in claim 1, wherein the milling tools (53a, 53b) are arranged on a common milling slide (56).

9. The milling device (50) as claimed in claim 1, wherein the workpiece spindles (52a, 52b) are arranged on a common spindle slide (57).

10. The milling device (50) as claimed in claim 1, wherein the workpiece spindles (52a, 52b) are arranged side by side and oriented the same and the milling tools (53a, 53b) are arranged side by side and oriented the same.

11. A method for operating the milling device (50) as claimed in claim 1, the method comprising:
a) positioning the workpiece spindles (52a, 52b) and the milling tools (53a, 53b) offset in relation to one another for loading the workpiece spindles (52a, 52b) in such a way that the one of the first and second lens blanks (100a, 100b) is capable of being introduced between the milling tools (53a, 53b) and through the space which intersects the virtual straight line that extends lengthwise from the first end point to the second end point, the first end point linked to the first milling tool (53a) and being at a position within a physical body of the first milling tool (53a), and the second end point linked to the second milling tool (53b) and being at a position within a physical body of the second milling tool (53b);

b) loading of the first lens blank (100a) through the space, which intersects the virtual straight line extending between the milling tools (53a, 53b), and across the virtual straight line and into the first workpiece spindle (52a), and loading of the second lens blank (100b) into the second workpiece spindle (52b);

c) simultaneous machining of the first lens blank (100a) with the first milling tool (53a), and machining of the second lens blank (100b) with the second milling tool (53b);

d) positioning the workpiece spindles (52a, 52b) and the milling tools (53a, 53b) offset in relation to one another for deloading the workpiece spindles in such a way that the one of the first and second lens blanks (100a, 100b) is capable of being introduced between the milling tools (53a, 53b) and through the space which intersects the virtual straight line that extends lengthwise from the first end point to the second end point, the first end point linked to the first milling tool (53a) and being at the position within the physical body of the first milling tool (53a), and the second end point linked to the second milling tool (53b) and being at the position within the physical body of the second milling tool (53b); and e) subsequent removal of the first lens blank (100a) and removal of the second lens blank (100b) from the workpiece spindles (52a, 52b).

12. The method as claimed in claim 11, wherein the workpiece spindles (52a, 52b) are arranged side by side and oriented the same, and the milling tools (53a, 53b) are arranged side by side and oriented the same.

* * * * *